United States Patent [19]
Adachi

[11] Patent Number: 5,959,785
[45] Date of Patent: Sep. 28, 1999

[54] ACHROMATIC LENS SYSTEM INCLUDING A DIFFRACTION LENS

[75] Inventor: Yuka Adachi, Aichi-ken, Japan

[73] Assignee: Asahi Kogaku Kogyo Kabushiki Kaisha, Tokyo, Japan

[21] Appl. No.: 09/089,385

[22] Filed: Jun. 3, 1998

[30] Foreign Application Priority Data

Jun. 5, 1997 [JP] Japan .................................. 9-148183

[51] Int. Cl.⁶ .................................................. G02B 15/14
[52] U.S. Cl. ............................................ 359/692; 359/691
[58] Field of Search .................................... 359/691, 692, 359/793, 794, 795

[56] References Cited

U.S. PATENT DOCUMENTS 5,568,325 10/1996 Hirano et al. .
5,629,799 5/1997 Maruyama et al. .

FOREIGN PATENT DOCUMENTS 5142468 6/1993 Japan .
7151964 6/1995 Japan .

OTHER PUBLICATIONS

"Hybrid Diffractive–Refractive Lenses and Achromats", Applied Optics, vol. 27, No. 14, Jul. 15, 1988 (pp. 2960–2971).

Primary Examiner—Hung Xuan Dang
Attorney, Agent, or Firm—Greenblum & Bernstein, P.L.C.

[57] ABSTRACT

An achromatic lens system comprising a front lens group, a diffraction lens and a rear lens group, in this order from the object side, wherein; the front lens group is provided with a frontmost convex surface on the object side and a rearmost concave surface on the image side; the rear lens group is provided with a rearmost convex surface on the image side; the front and rear lens groups are arranged to generate under-axial chromatic aberration for blue light and generate over-axial chromatic aberration for red light, with respect to green light that is considered the reference light; and, achromatic correction of light in the visible region is conducted by correcting the axial chromatic aberrations with a diffracting function of the diffraction lens.

9 Claims, 22 Drawing Sheets

SPHERICAL ABERRATION

CHROMATIC ABERRATION

LATERAL CHROMATIC ABERRATION

ASTIGMATISM

DISTORTION

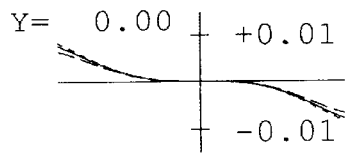
Fig.3A
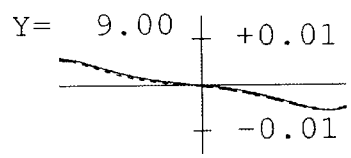
Fig.3B
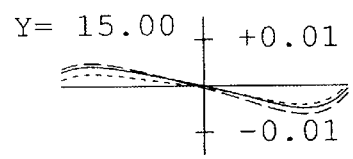
Fig.3C
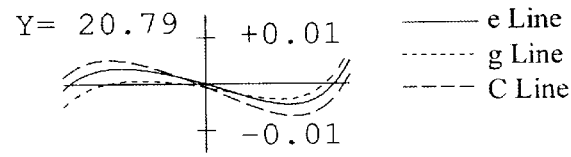
Fig.3D
Fig.4
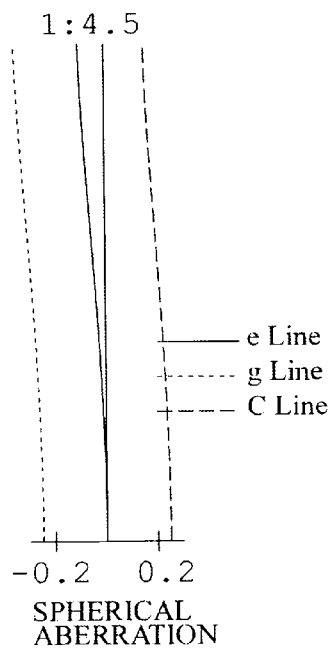
SPHERICAL ABERRATION
CHROMATIC ABERRATION

SPHERICAL ABERRATION
CHROMATIC ABERRATION

LATERAL CHROMATIC ABERRATION

ASTIGMATISM

DISTORTION

SPHERICAL ABERRATION

CHROMATIC ABERRATION

Fig.9
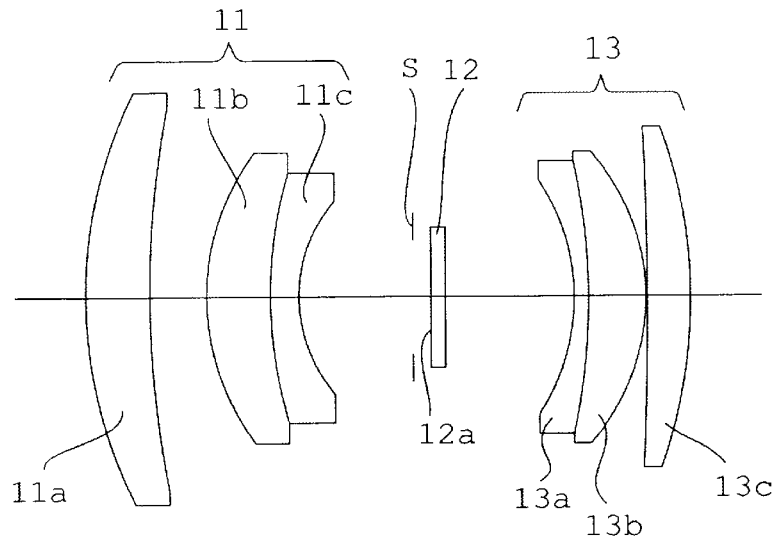
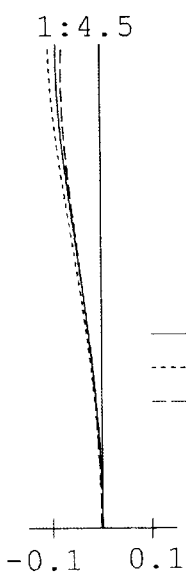
Fig.10A
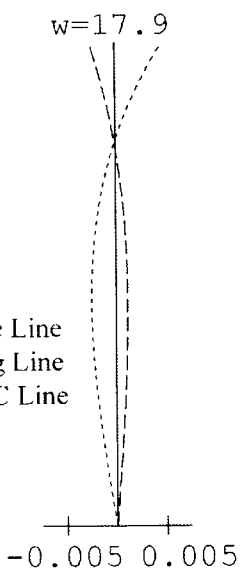
Fig.10B
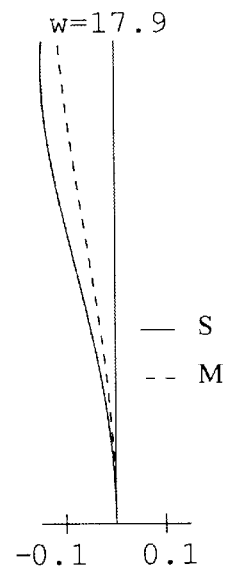
Fig.10C
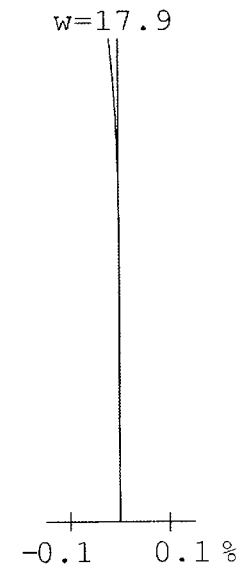
Fig.10D

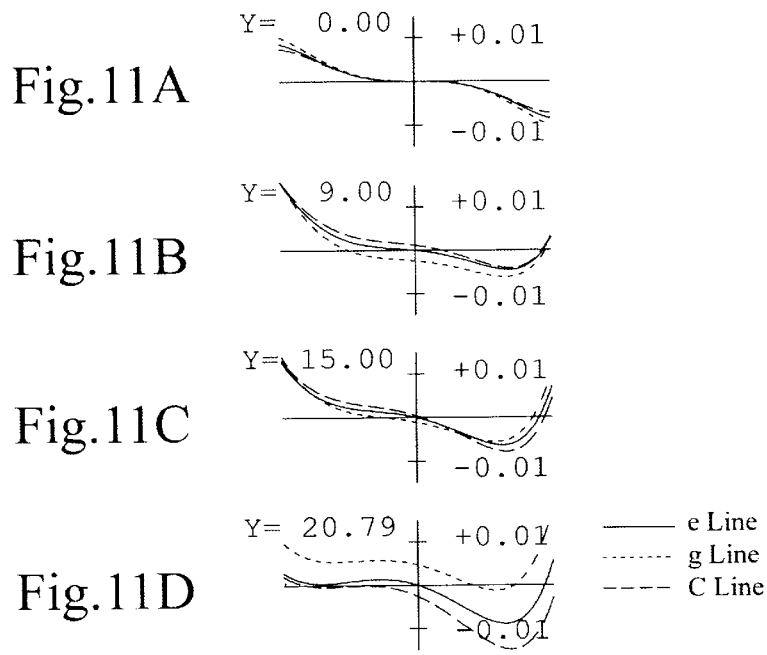
Fig.11A
Fig.11B
Fig.11C
Fig.11D
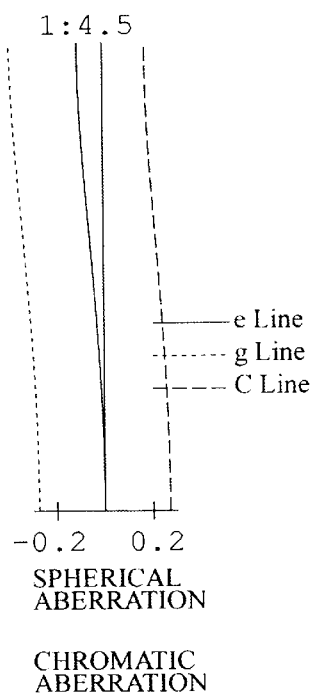
Fig.12
SPHERICAL ABERRATION
CHROMATIC ABERRATION

SPHERICAL ABERRATION

CHROMATIC ABERRATION

LATERAL CHROMATIC ABERRATION

ASTIGMATISM

DISTORTION

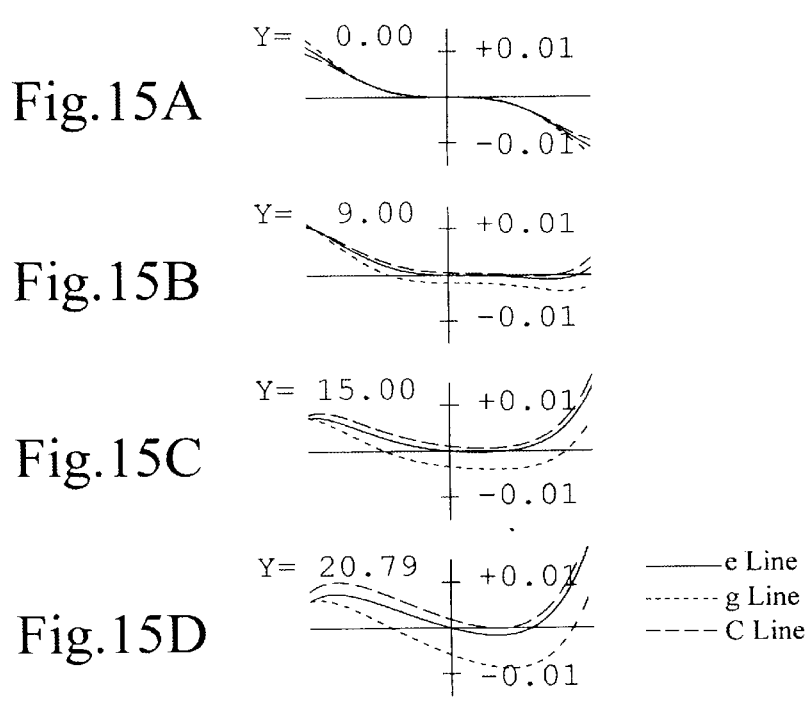
Fig.15A
Fig.15B
Fig.15C
Fig.15D
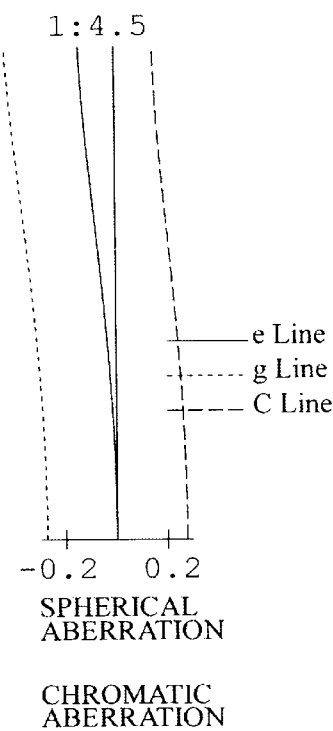
Fig.16
SPHERICAL ABERRATION
CHROMATIC ABERRATION

SPHERICAL
ABERRATION

CHROMATIC
ABERRATION

LATERAL
CHROMATIC
ABERRATION

ASTIGMATISM

DISTORTION

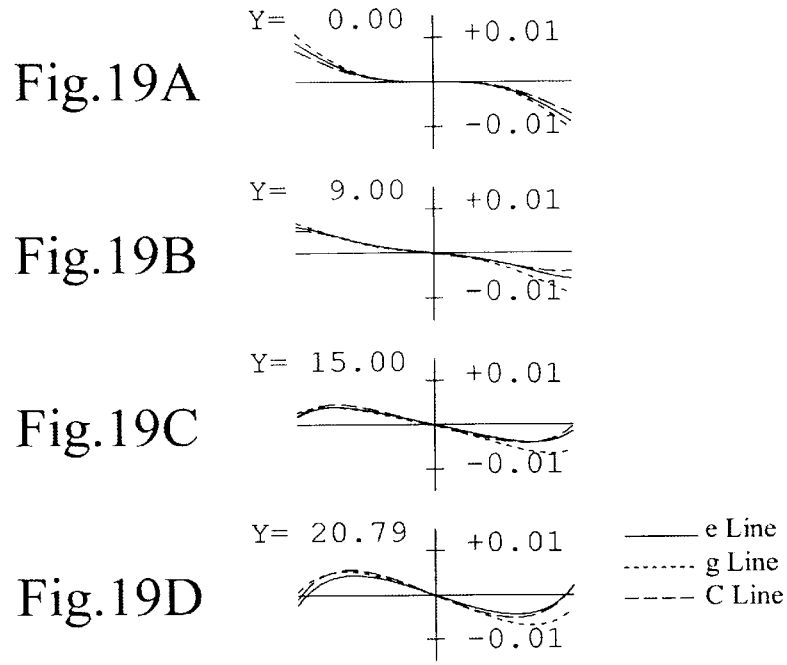
Fig.19A
Fig.19B
Fig.19C
Fig.19D
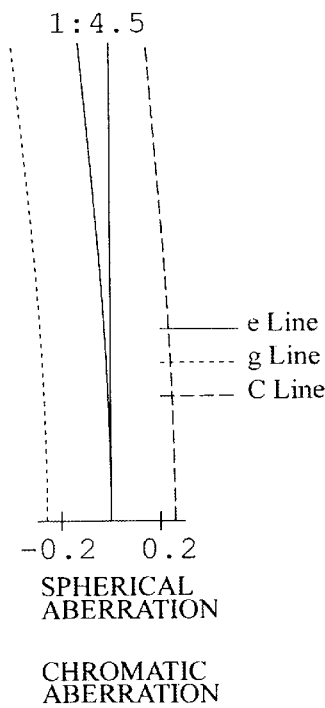
Fig.20
SPHERICAL ABERRATION
CHROMATIC ABERRATION

SPHERICAL
ABERRATION

CHROMATIC
ABERRATION

LATERAL
CHROMATIC
ABERRATION

ASTIGMATISM

DISTORTION

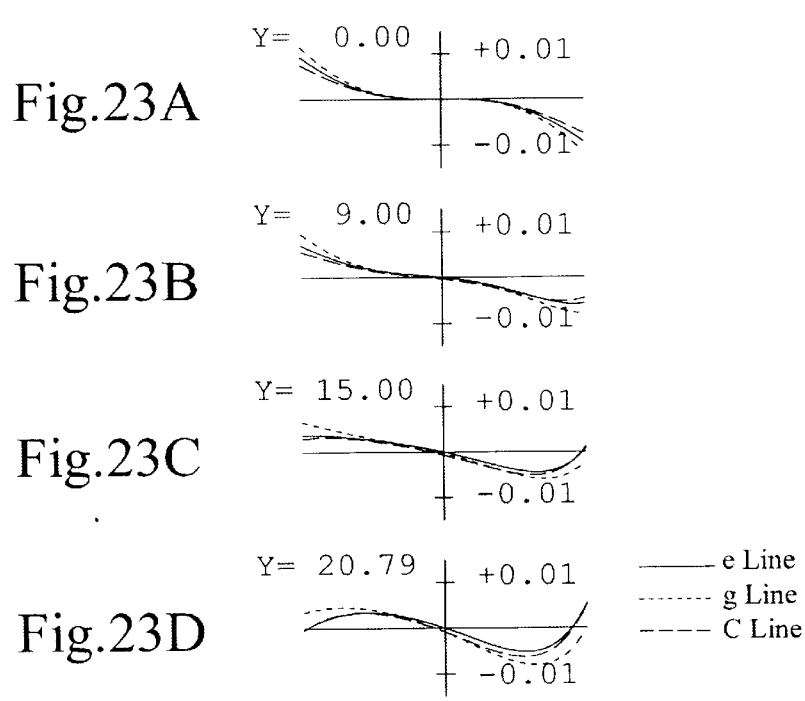
Fig.23A
Fig.23B
Fig.23C
Fig.23D
— e Line
······ g Line
---- C Line
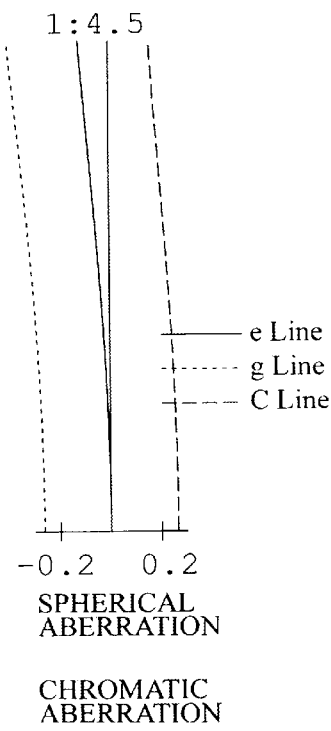
Fig.24
SPHERICAL ABERRATION
CHROMATIC ABERRATION Fig.25
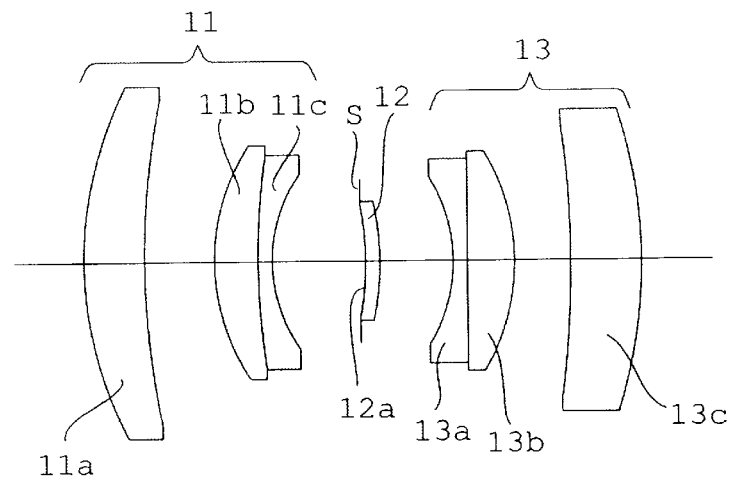
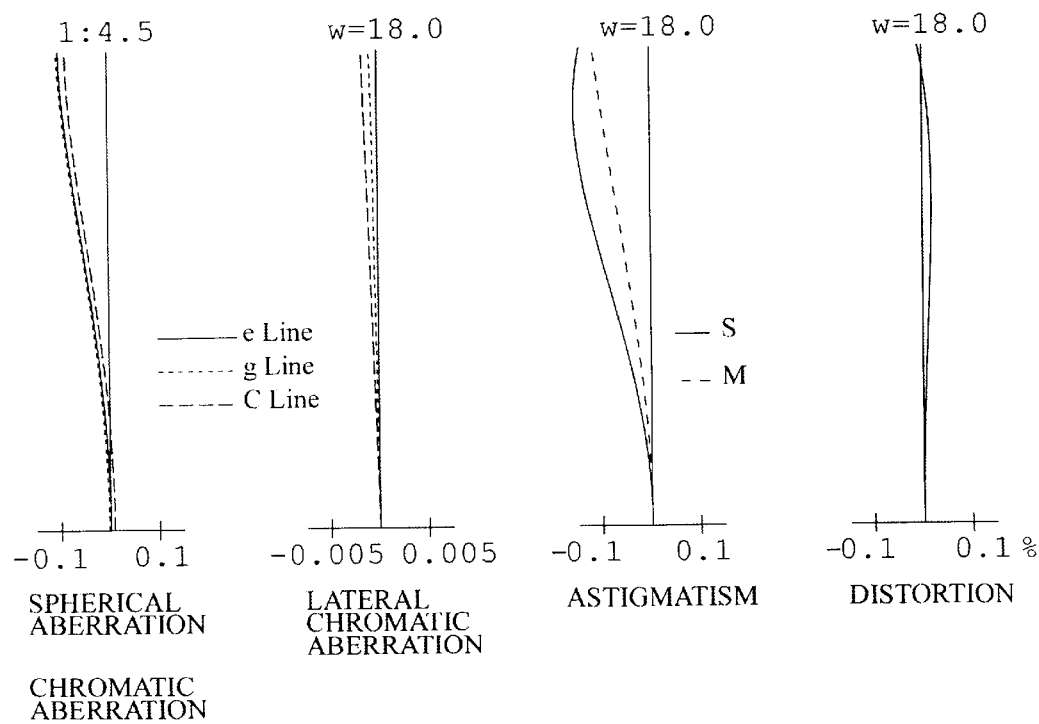
Fig.26A  Fig.26B  Fig.26C  Fig.26D

SPHERICAL ABERRATION

CHROMATIC ABERRATION

Fig.29
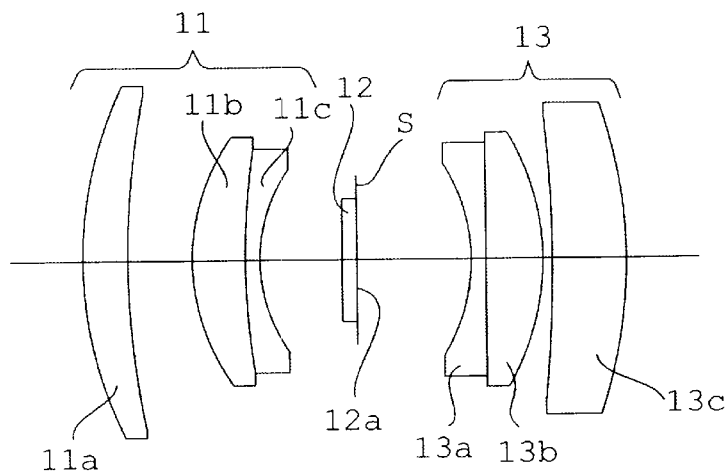
Fig.30A | Fig.30B | Fig.30C | Fig.30D
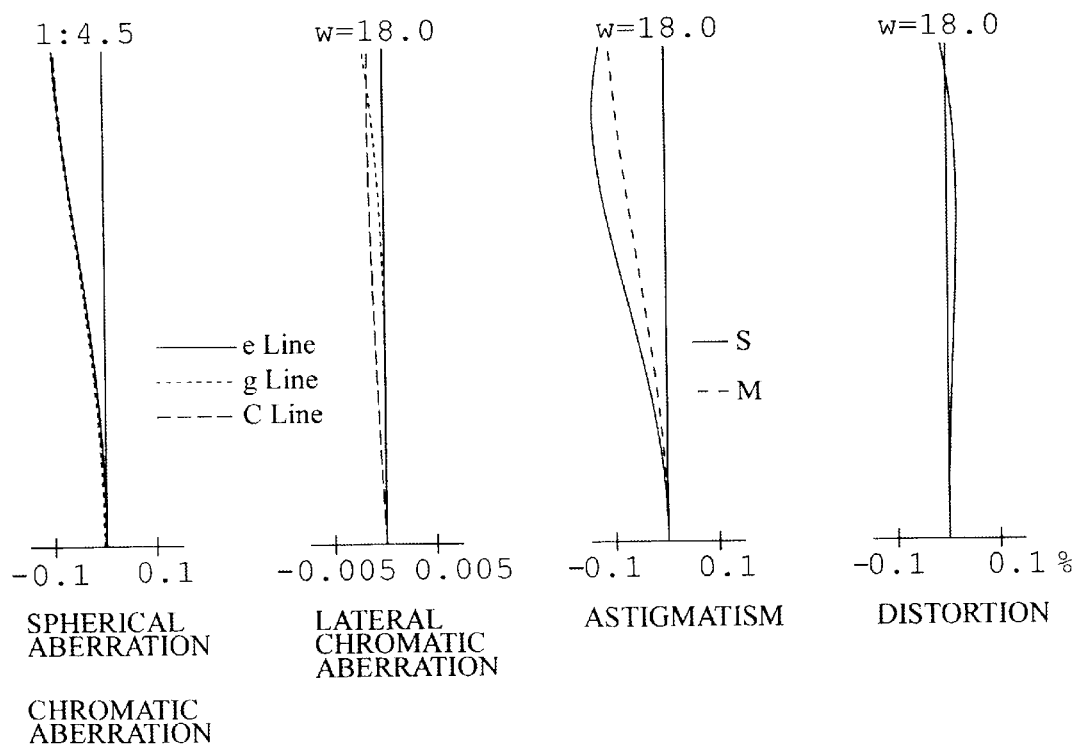

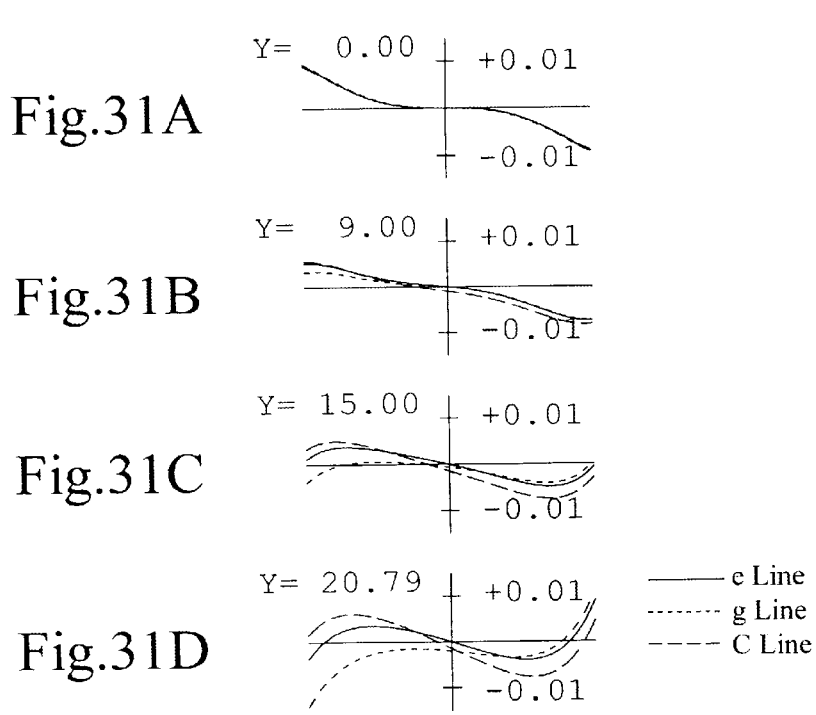
Fig.31A
Fig.31B
Fig.31C
Fig.31D
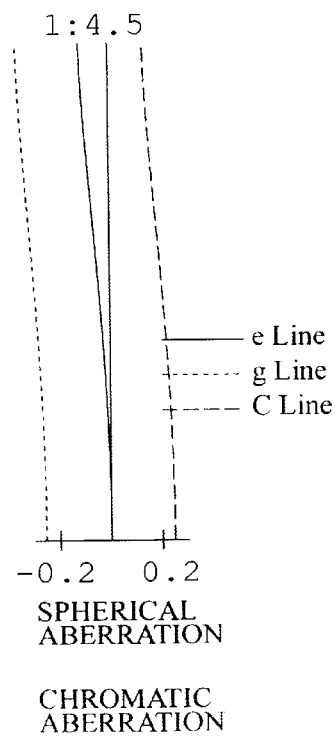
Fig.32

Fig.33
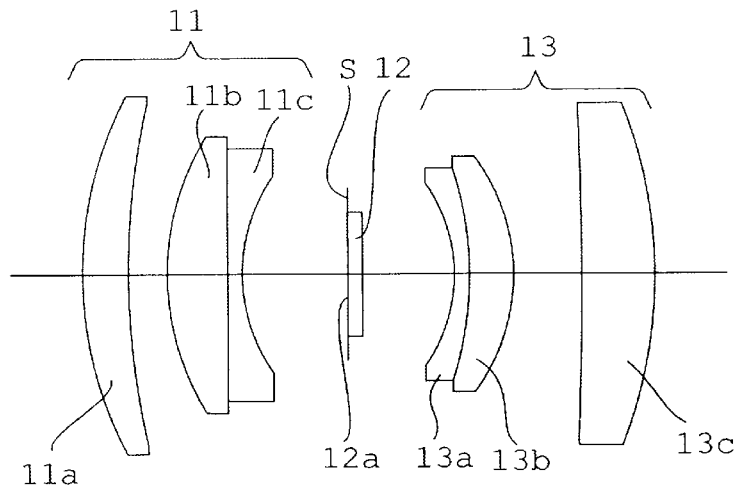
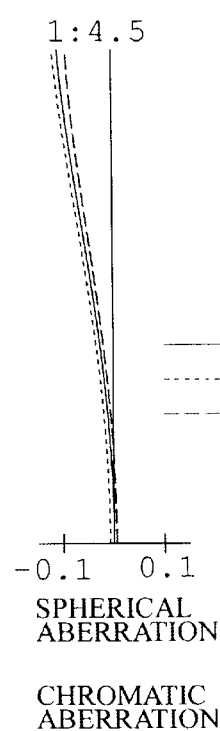
Fig.34A
1:4.5
——— e Line
······· g Line
– – – C Line
-0.1  0.1
SPHERICAL
ABERRATION
CHROMATIC
ABERRATION
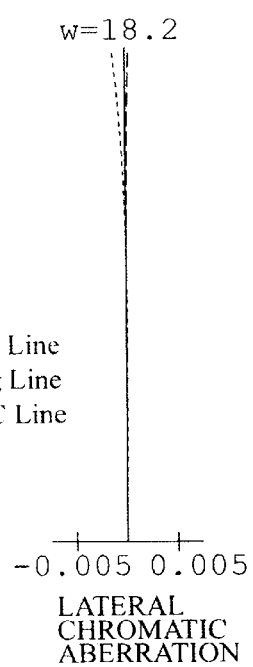
Fig.34B
w=18.2
-0.005 0.005
LATERAL
CHROMATIC
ABERRATION
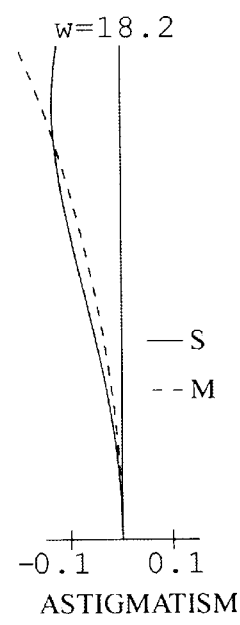
Fig.34C
w=18.2
—— S
– – M
-0.1  0.1
ASTIGMATISM
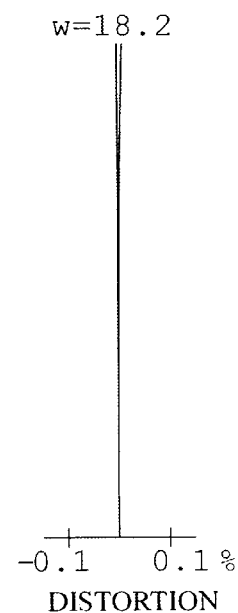
Fig.34D
w=18.2
-0.1  0.1 %
DISTORTION

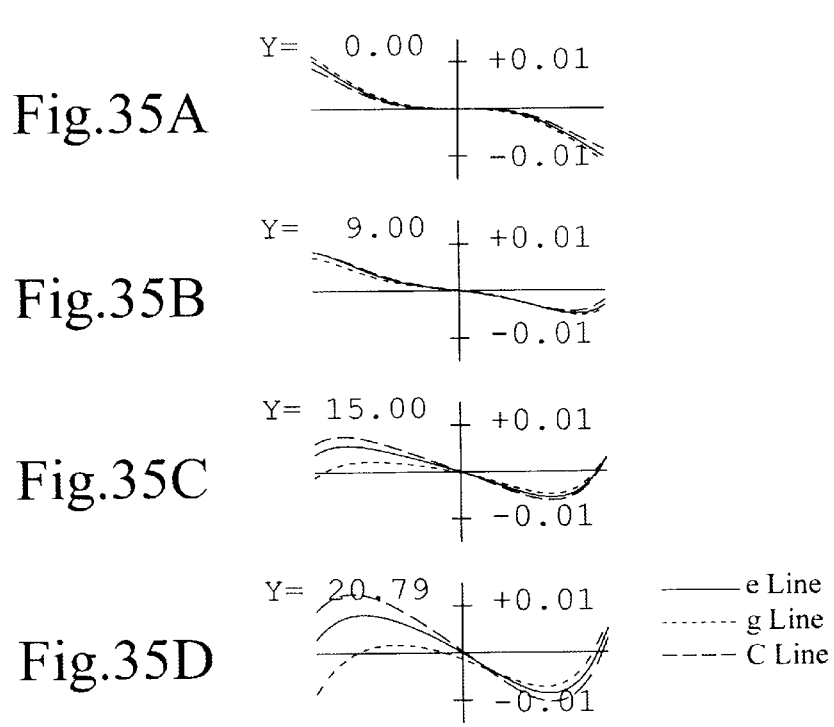
Fig.35A
Fig.35B
Fig.35C
Fig.35D
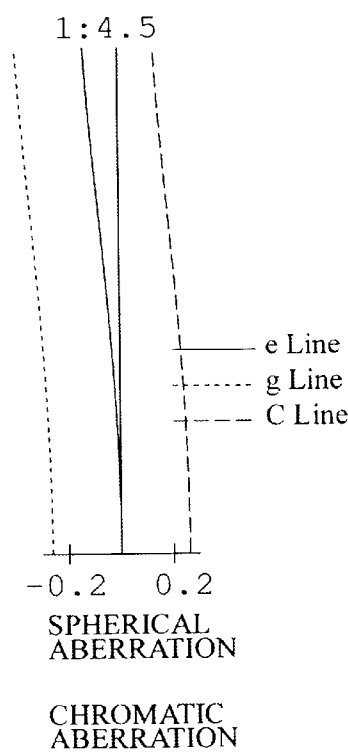
Fig.36
SPHERICAL ABERRATION
CHROMATIC ABERRATION

ACHROMATIC LENS SYSTEM INCLUDING A DIFFRACTION LENS

BACKGROUND OF THE INVENTION

1. Field of the Invention

The present invention relates to an achromatic lens system.

2. Description of the Related Art

To constitute the so-called apochromatic lens system in which axial chromatic aberrations at three wavelengths of light are well corrected, it is necessary to appropriately set up a functional combination of a plurality of lenses including an anomalous dispersion glass. However, anomalous dispersion glass is expensive and tends to be influenced by a variation of temperature.

An apochromatic lens system using no anomalous dispersion glass has been proposed, for example, in the Japanese Unexamined Patent Publication No. 5-142468 and No. 7-151964, in which a cemented lens consisting of positive and negative lens elements having different relative partial dispersions is provided at an intermediate location between a front lens group and a rear lens group. However, employing a cemented lens consisting of two lens elements adds to the manufacturing cost of the apochromatic system as a whole.

It is an object of the present invention to provide a simple and highly effective and efficient achromatic lens system (achromatic lens system) in which axial chromatic aberrations at three or more wavelengths can be effectively corrected.

SUMMARY OF THE INVENTION

To achieve the object mentioned above, according to an aspect of the present invention, there is provided an achromatic lens system comprising a front lens group, a diffraction lens and a rear lens group, in this order from the object side, wherein; the front lens group is provided with a frontmost convex surface on the object side and a rearmost concave surface on the image side; the rear lens group is provided with a rearmost convex surface on the image side; the front and rear lens groups are arranged to generate under-axial chromatic aberration for blue light and generate over-axial chromatic aberration for red light, with respect to green light that is considered the reference light; and, achromatic correction of light in the visible region is conducted by correcting the axial chromatic aberrations with a diffracting function of the diffraction lens.

The achromatic lens system preferably satisfies the following conditions:

$$1.0 < f_F/f_R < 5.0 \quad (1)$$

$$0.004 < \Phi_1/\Phi_2 < 0.011 \quad (2)$$

wherein $f_F$ is the focal length of the front lens group;

$f_R$ is the focal length of the rear lens group;

$\Phi_1$ is the diffraction power of the diffraction surface of the diffraction lens;

$\Phi_2$ is the sum of the powers of the positive lens elements of the entire lens system.

In the achromatic lens system, it is preferable that a diaphragm be provided between the front and rear lens groups. The diaphragm can be provided in front of or behind the diffraction lens. The front lens group can constitute three lens elements consisting of a positive lens element, a positive lens element, and a negative lens element, in this order from the object side. Furthermore, as an alternative, from the object side, an arrangement consisting of a (single) positive lens element and a cemented lens having positive and negative lens elements can be provided. Likewise, the rear lens group can constitute three lens elements consisting of a negative lens element, a positive lens element, and a positive lens element, in this order from the object side. As another alternative, from the object side, an arrangement consisting of a cemented lens having negative and positive lens elements and a (single) positive lens element can be provided.

The present disclosure relates to subject matter contained in Japanese Patent Application No.09-148183 (filed on Jun. 5, 1997) which is expressly incorporated herein by reference in its entirety.

BRIEF DESCRIPTION OF THE DRAWINGS

The invention will be described below in detail with reference to the accompanying drawings, in which;

FIGS. 3A–3D show aberration diagrams of an achromatic lens system shown in FIG. 1;

FIG. 4 shows axial chromatic aberration diagrams of a front lens group and a rear lens group in an achromatic lens system shown in FIG. 1, in which no diffraction lens is used;

FIG. 9 is a schematic view of a lens arrangement of an achromatic lens system according to a third embodiment of the present invention;

FIGS. 10A–10D show aberration diagrams of an achromatic lens system shown in FIG. 9;

FIGS. 11A–11D show aberration diagrams of an achromatic lens system shown in FIG. 9;

FIG. 12 shows axial chromatic aberration diagrams of a front lens group and a rear lens group in an achromatic lens system shown in FIG. 9, in which no diffraction lens is used;

FIGS. 15A–15D show aberration diagrams of an achromatic lens system shown in FIG. 13;

FIG. 16 shows axial chromatic aberration diagrams of a front lens group and a rear lens group in an achromatic lens system shown in FIG. 13, in which no diffraction lens is used;

FIGS. 19A–19D show aberration diagrams of an achromatic lens system shown in FIG. 17;

FIG. 20 shows axial chromatic aberration diagrams of a front lens group and a rear lens group in an achromatic lens system shown in FIG. 17, in which no diffraction lens is used;

FIGS. 23A–23D show aberration diagrams of an achromatic lens system shown in FIG. 21;

FIG. 24 shows axial chromatic aberration diagrams of a front lens group and a rear lens group in an achromatic lens system shown in FIG. 21, in which no diffraction lens is used;

FIG. 25 is a schematic view of a lens arrangement of an achromatic lens system according to a seventh embodiment of the present invention;

FIGS. 26A–26D show aberration diagrams of an achromatic lens system shown in FIG. 25;

FIG. 29 is a schematic view of a lens arrangement of an achromatic lens system according to an eighth embodiment of the present invention;

FIGS. 30A–30D show aberration diagrams of an achromatic lens system shown in FIG. 29;

FIGS. 31A–31D show aberration diagrams of an achromatic lens system shown in FIG. 29;

FIG. 32 shows axial chromatic aberration diagrams of a front lens group and a rear lens group in an achromatic lens system shown in FIG. 29, in which no diffraction lens is used;

FIG. 33 is a schematic view of a lens arrangement of an achromatic lens system according to a ninth embodiment of the present invention;

FIGS. 34A–34D show aberration diagrams of an achromatic lens system shown in FIG. 33;

FIGS. 35A–35D show aberration diagrams of an achromatic lens system shown in FIG. 33;

FIG. 36 shows axial chromatic aberration diagrams of a front lens group and a rear lens group in an achromatic lens system shown in FIG. 33, in which no diffraction lens is used;

DESCRIPTION OF THE PREFERRED EMBODIMENT

Figure 37:
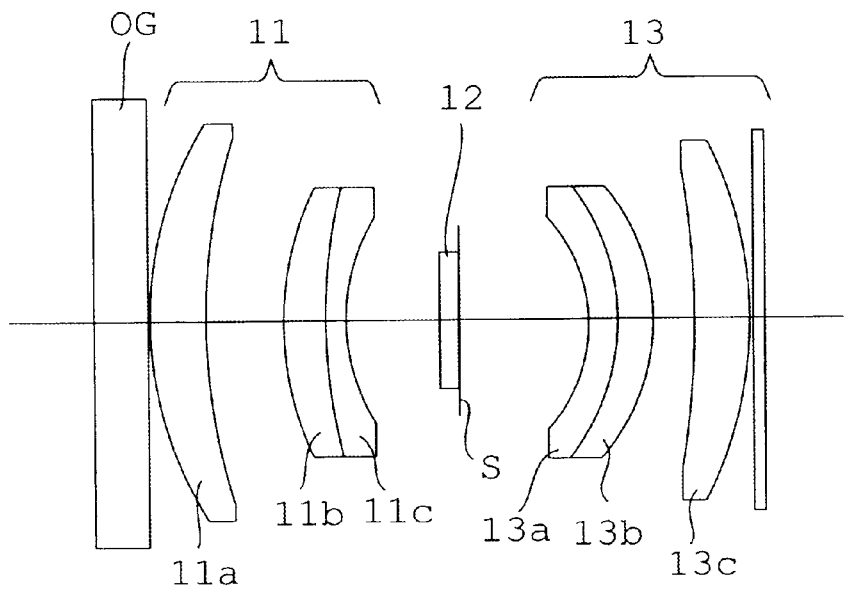
FIG. 37 is a schematic view of a lens arrangement of an achromatic lens system according to the present invention.

FIG. 37 shows an achromatic lens system according to the present invention. The achromatic lens system is comprised of a front lens group 11 having positive power, a diffraction lens 12, and a rear lens group 13 having positive power, in this order from the object side. A diaphragm S is provided adjacent to the diffraction lens 12. In the arrangement shown in FIG. 37, the diaphragm S is attached to the image-side surface of the diffraction lens 12. The diaphragm S can optionally be located at any position between the front lens group 11 and the rear lens group 13.

Figure 40:
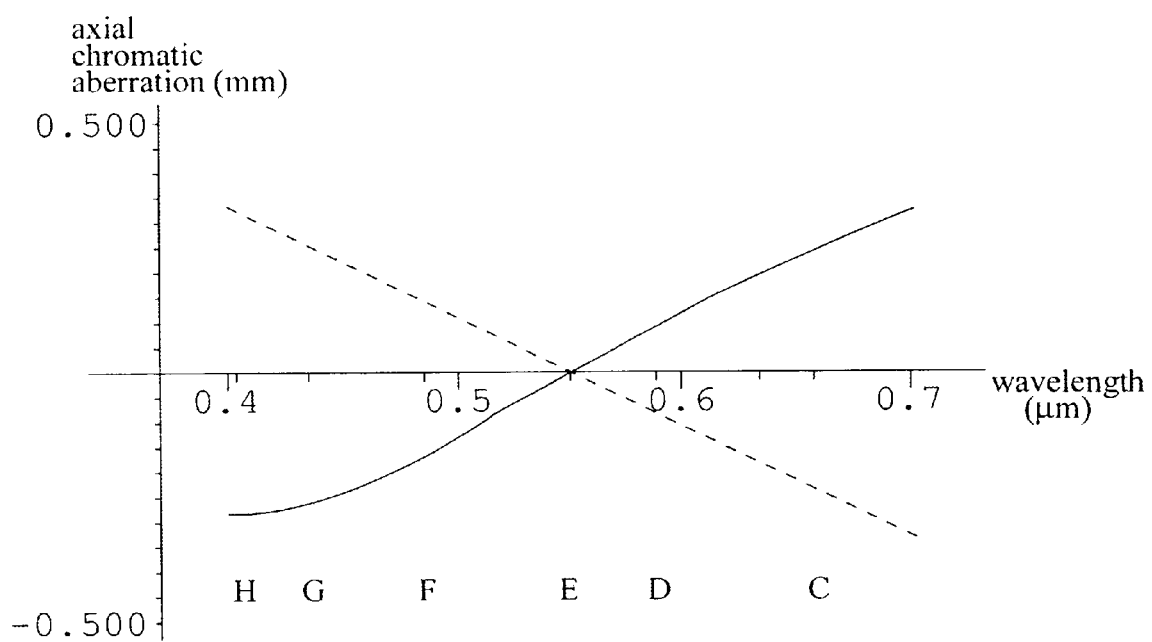
FIG. 40 shows a graph showing axial chromatic aberrations produced by a front lens group and a rear lens group in an achromatic lens system, according to the present invention; and, FIG. 41 shows a graph showing axial chromatic aberrations produced in an achromatic lens system, according to the present invention.

Spherical aberration, coma, astigmatism, curvature-of-field, and distortion are corrected by the front and rear lens groups 11 and 13. Conversely, as the solid line in FIG. 40 shows, with respect to the wavelength of green light on the abscissa, the front lens group 11 and the rear lens group 13 are designed to generate axial chromatic aberration for blue light under the abscissa (in the negative direction along the ordinate), and axial chromatic aberration for red light over the abscissa (in the positive direction along the ordinate).

Figure 39:
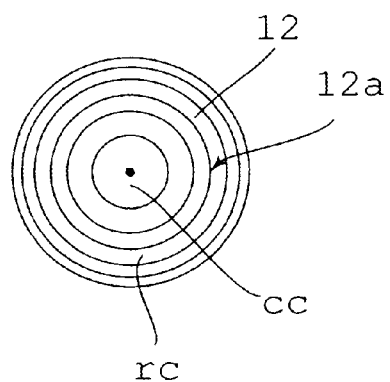
FIG. 39 is a front elevational view of a diffraction surface of a diffraction lens shown in FIG. 38.
Figure 38:
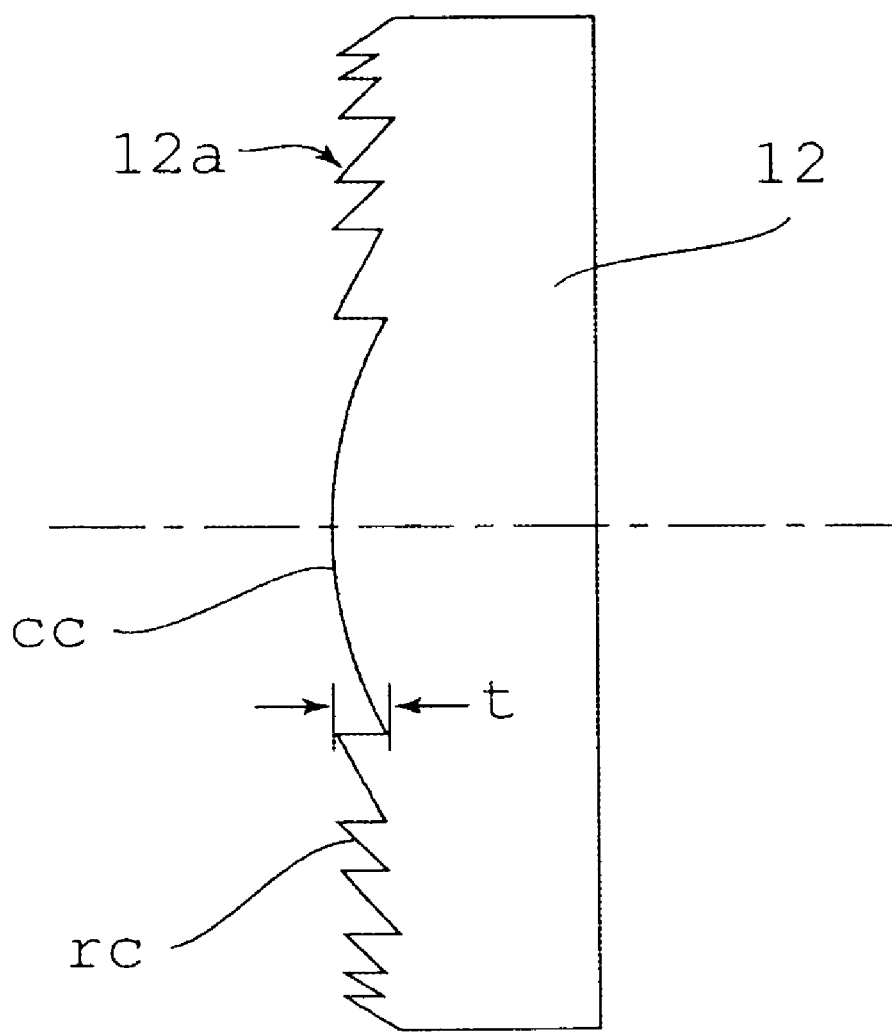
FIG. 38 is an enlarged sectional view of a diffraction lens shown in FIG. 37.
Figure 41:
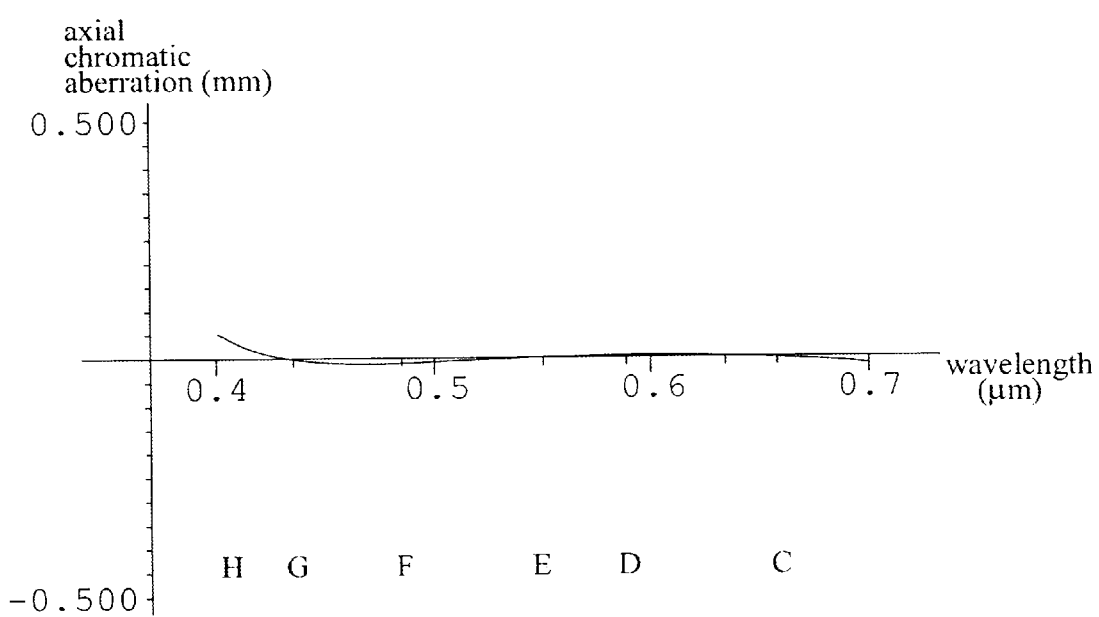

The diffraction lens 12 is provided on one of the front and rear surfaces with a diffraction surface 12a to correct axial chromatic aberration. The diffraction surface 12a is formed to have a number of stepped concentric annuli (rings) to correct axial chromatic aberrations generated by the front and rear lens groups 11 and 13, due to the diffraction effect. As can be seen in FIGS. 38 and 39, the diffraction surface 12a is provided with a central circular incident surface "cc" and concentric annular incident surfaces "rc" surrounding the central incident surface "cc." Between the central incident surface "cc" and the annular incident surface "rc", and between the adjacent annular incident surfaces "rc", a surface "t" is provided. The surface "t" is formed so that for a reference wavelength of light (green), there is no phase difference between light incident upon the above incident surfaces, and for a wavelength of light different from the reference wavelength, a phase difference according to a deviation from the reference wavelength is provided to the incident light to thereby make the light convergent or divergent. In other words, a wavelength of blue light is shorter than the reference wavelength (green), so that the divergence of the light is enhanced as the wavelength is shortened, as indicated by dotted line in FIG. 40. On the other hand, a wavelength of red light is longer than the reference wavelength (green), the convergence of the light is enhanced as the wavelength is increased. Accordingly, axial chromatic aberrations of red light and blue light generated by the front and rear lens groups 11 and 13 can be corrected. FIG. 41 shows an example of resultant axial chromatic aberration in the achromatic lens system according to the present invention, which is obtained by combining axial chromatic aberrations indicated by the solid line and the dotted line in FIG. 40. The length of the surface "t" is in the order of a few microns ($\mu$), the size of which is exaggerated in the drawings.

In the lens system according to the present invention, the frontmost and rearmost surfaces of the front lens group 11 on the object side and the image side are respectively made of a convex surface and a concave surface. The rearmost surfaces of the rear lens group 13 on the image side is made of a convex surface to form a Gauss type lens or a modified Gauss type lens having a substantially symmetrical arrangement with respect to the diaphragm S. The frontmost surface of the front lens group 11 made of a convex surface ensures that the light can be converged without generating a lot of spherical aberration. Moreover, the rearmost surface of the front lens group 11 composed of a concave surface constitutes a negative lens having stronger negative power close to the diaphragm S. Accordingly, no coma or astigmatism is substantially generated upon correction of the Petzval's sum. Furthermore, due to the substantially symmetrical lens arrangement with respect to the diaphragm S, there is an advantage that aberrations generated in the front lens group can be compensated by the rear lens group.

Condition (1) specifies the ratio of the focal length between the front lens group 11 and the rear lens group 13.

If the ratio defined in condition (1) is above the upper limit, axial chromatic aberration of the entire optical system becomes under (see the abscissa of FIG.40) at the long wavelength side (red region). It should be noted that the optical system is not under achromatism. Moreover, coma is intensified, thus resulting in a low contrast.

Conversely, if the ratio defined in condition (1) is below the lower limit, axial chromatic aberration of the entire optical system becomes over (see the abscissa of FIG.40) at the long wavelength side (red region), so that axial chromatic aberration is substantially the same as that of a conventional refracting lens. Moreover, flaring occurs at the peripheral portion of the lens, thus resulting in poor contrast.

Condition (2) specifies the power distribution of the achromatizing diffraction lens and the positive lens elements of the entire lens system. In a conventional lens arrangement using a refracting lens only, it is possible to carry out the achromatization for specific two or three wavelengths in the visible range of light, but it is almost impossible to completely eliminate the axial chromatic aberration over the entire visible range.

If the condition (2) is satisfied, the degree of dependence of the focal length on the wavelength due to diffraction, and the degree of dependence of the focal length on the wavelength due to refraction mutually compensate each other, and hence axial chromatic aberration can be made almost zero over the entire visible region. Thus, chromatic correction can be conducted. If the diffraction is so strong that the ratio is larger than the upper limit in condition (2) or the diffraction is so weak that the ratio is smaller than the lower limit in condition (2), it is impossible to effectively achromatize light for not less than three wavelengths.

The denominator $\Phi_2$ of the ratio defined by the expression (2) is given by;

$$\Phi_2 = \Sigma \Phi_p = \Sigma(1/f_p)$$

wherein $f_p$ and $\Phi_p$ represent the focal length and power of the p-th positive lens element, respectively.

Numerical examples (Embodiments 1 through 9) of the present invention will be discussed below. In each embodiment, a document-support glass plate (not shown) having a refractive index of 1.52 and a thickness of 3.25 mm is provided on the object side of the front lens group 11, and a CCD glass cover (not shown) having a refractive index of 1.52 and thickness of 0.7 mm is provided on the image side of the rear lens group 13.

In tables below and the drawings, "$F_{NO}$" designates the F-number, "f" designates the focal length of the entire lens system, "M" designates the lateral magnification, and "w" designates the half angle of view. The surface No. is counted from the object side. "R" designates the radius of curvature, "D" designates the lens thickness or distance between the lenses, "$N_e$" designates the refractive index of the e-line, "$\nu_e$" designates the Abbe number, and "$\theta_{ge}$" designates the partial dispersion ratio which is given by the following expression, respectively.

$$\theta_{ge} = (n_e - n_g)/(n_F - n_C)$$

wherein $n_e$, $n_g$, $n_F$ and $n_C$ represent the refractive indexes of the e-line, g-line, F-line and C-line.

The surface No. with suffix * indicates a diffraction surface. In a diffraction lens, an additional length to be added to the optical path length is expressed as a function $\psi(h)$ (i.e., optical path difference function) of a height "h" from the optical axis. The optical path difference function is represented by:

$$\psi(h) = (P_2 h^2 + P_4 h^4 + \ldots)\lambda$$

wherein $P_n$ represents the n-th order optical path difference function coefficient and $\lambda$ represents the wavelength, respectively.

As the wavelength $\lambda$ can be used an optional wavelength to evaluate the 1st order diffraction light. In the expression above, if the coefficient of the term of $h^2$ is negative, the lens system has a positive power in the paraxial domain, and if the coefficient of the term of $h^4$ is positive, the negative power increases toward the peripheral portion of the lens. It should be noted that the optical path difference function coefficients which are not indicated are zero.

EXAMPLE 1

Figure 1:
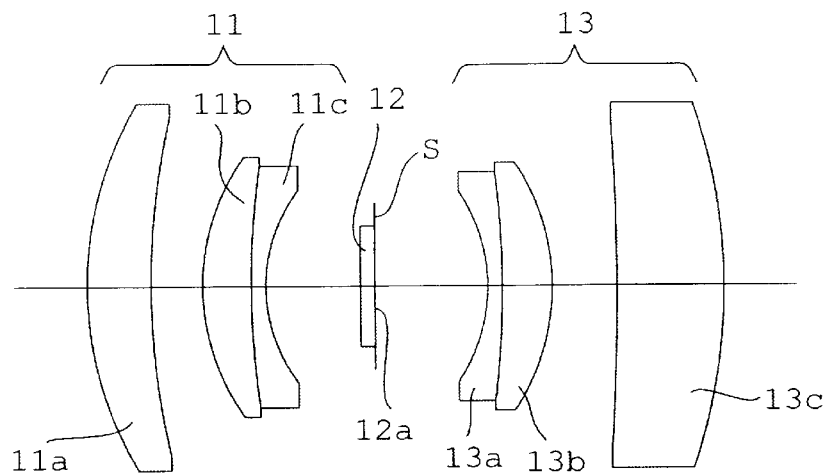
FIG. 1 is a schematic view of a lens arrangement of an achromatic lens system according to a first embodiment of the present invention.
Figure 2A:
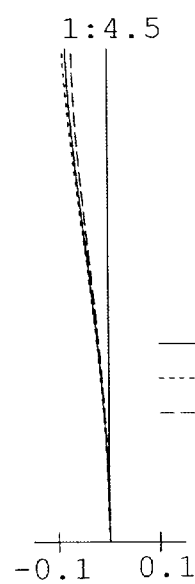
FIGS. 2A–2D show aberration diagrams of an achromatic lens system shown in FIG. 1.
Figure 2B:
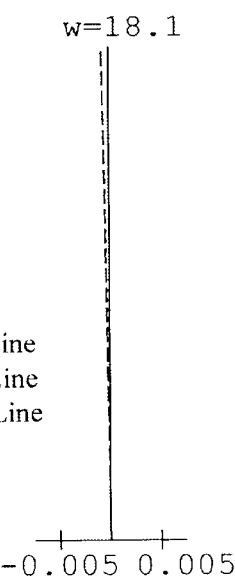
Figure 2C:
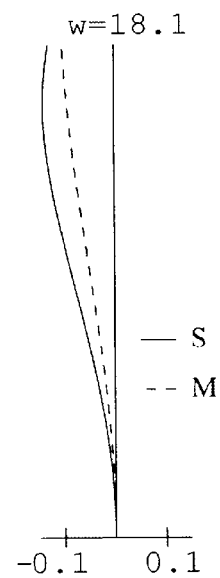
Figure 2D:
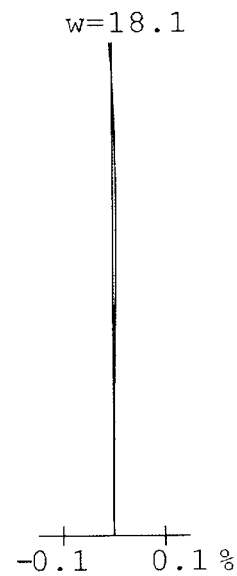

FIG. 1 shows a lens arrangement of the first embodiment of an achromatic lens system according to the present invention. The achromatic lens system is comprised of a front lens group 11, a diffraction lens 12 having a diffraction surface 12a on the image side, a diaphragm S, and a rear lens group 13, in this order from the object side. The diaphragm S is attached to the image-side surface (the diffracting surface 12a) of the diffracting lens 12. The front lens group 11 is composed of a positive meniscus lens 11a having a convex surface is located on the object side, and a cemented lens consisting of a positive lens element 11b and a negative lens element 11c, in this order from the object side. The rear lens group 13 is composed of a cemented lens consisting of a negative lens element 13a and a positive lens element 13b, and a positive lens element 13c, in this order from the object side. FIGS. 2 and 3 show aberration diagrams of the lens system shown in FIG. 1. It is noted that "S" designates the sagittal plane, and "M" designates the meridional plane. Numerical data of the lens system shown in FIG. 1 is shown in Table 1 below. FIG. 4 shows an axial chromatic aberration of the front lens group and the rear lens group when no diffraction lens is provided.

TABLE 1

$F_{NO} = 1:4.5$
$f = 54.4$
$M = -0.189$
$W = 18.1°$

| Surface No. | R | D | $N_e$ | $\nu_e$ | $\theta_{ge}$ |
|---|---|---|---|---|---|
| 1 | 26.268 | 4.38 | 1.70557 | 41.0 | 1.045 |
| 2 | 55.103 | 3.52 | — | — | — |
| 3 | 16.370 | 3.33 | 1.77621 | 49.3 | 1.012 |
| 4 | 61.435 | 1.00 | 1.67158 | 32.8 | 1.060 |
| 5 | 11.559 | 6.53 | — | — | — |
| 6 | ∞ | 1.00 | 1.49379 | — | — |
| 7 * | 620.175 | 0.00 | — | — | — |
| Diaphragm | ∞ | 7.77 | — | — | — |
| 8 | −12.430 | 1.00 | 1.62409 | 36.0 | 1.053 |
| 9 | −66.672 | 3.43 | 1.77621 | 49.3 | 1.012 |
| 10 | −16.408 | 4.44 | — | — | — |

TABLE 1-continued

| | | | | | |
|---|---|---|---|---|---|
| 11 | −183.577 | 7.38 | 1.74795 | 44.5 | 1.030 |
| 12 | −41.054 | — | — | — | — |

* indicates the diffraction surface.

Diffraction surface data:

the coefficient of the optical path difference function $\psi(h)$ at the seventh surface is $P_2=-0.568$ The power $\Phi_1$ of the diffraction lens is obtained by $$\Phi_1 = -2 \times P_2 \times \lambda$$

For the e-line (wavelength is 0.00054607 mm) in the first embodiment, $\Phi_1 = -2 \times (-0.568) \times 0.00054607 = 0.00062034/$ mm. Therefore, the focal length $f_D$, which is obtained by $1/\Phi_1$, is 1612 mm.

EXAMPLE 2

Figure 5:
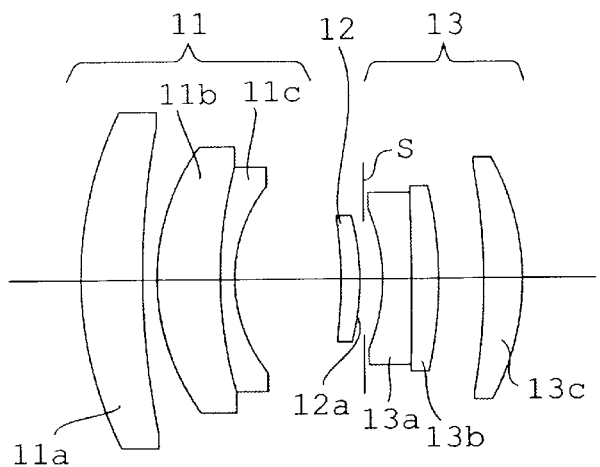
FIG. 5 is a schematic view of a lens arrangement of an achromatic lens system according to a second embodiment of the present invention.
Figure 6A:
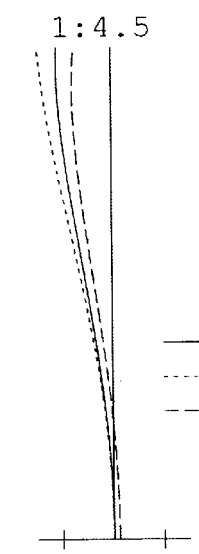
FIGS. 6A–6D show aberration diagrams of an achromatic lens system shown in FIG. 5.
Figure 6B:
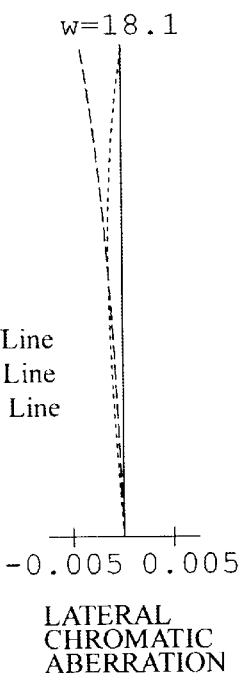
Figure 6C:
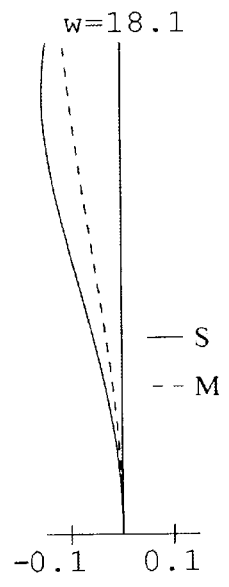
Figure 6D:
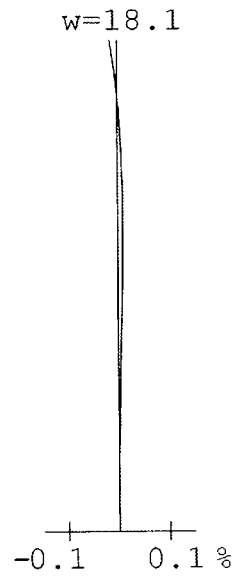
Figure 7A:
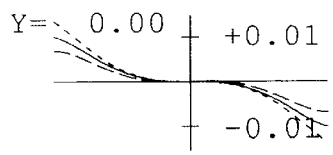
FIGS. 7A–7D show aberration diagrams of an achromatic lens system shown in FIG. 5.
Figure 7B:
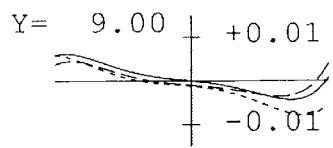
Figure 7C:
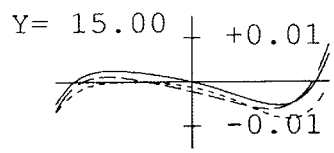
Figure 7D:
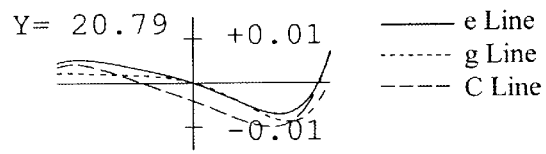
Figure 8:
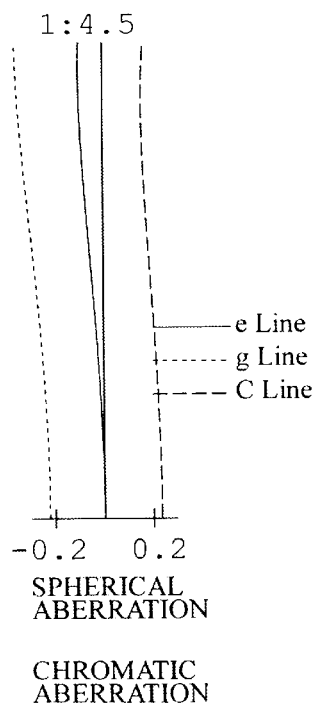
FIG. 8 shows axial chromatic aberration diagrams of a front lens group and a rear lens group in an achromatic lens system shown in FIG. 5, in which no diffraction lens is used.

FIG. 5 shows a lens arrangement of the second embodiment of an achromatic lens system according to the present invention. The basic structure is the same as that of the first embodiment. On the other hand, the diaphragm S is not attached to the image-side surface (the diffracting surface 12*a*) of the diffracting lens 12. FIGS. 6 and 7 show aberration diagrams. Numerical data of the second embodiment is shown in Table 2 below. FIG. 8 shows an axial chromatic aberration of the front lens group and the rear lens group when no diffraction lens is provided.

TABLE 2

$F_{NO} = 1:4.5$
$f = 53.3$
$M = -0.189$
$W = 18.1°$

| Surface No. | R | D | $N_e$ | $\nu_e$ | $\theta_{ge}$ |
|---|---|---|---|---|---|
| 1 | 27.860 | 4.25 | 1.70557 | 41.0 | 1.045 |
| 2 | 58.839 | 0.99 | — | — | — |
| 3 | 16.454 | 4.37 | 1.73234 | 54.4 | 1.001 |
| 4 | 30.603 | 1.00 | 1.65223 | 33.6 | 1.059 |
| 5 | 10.827 | 7.35 | — | — | — |
| 6 | −31.800 | 1.30 | 1.49379 | — | — |
| 7 * | −18.109 | 0.34 | — | — | — |
| Diaphragm | ∞ | 1.25 | — | — | — |
| 8 | −13.057 | 1.97 | 1.62409 | 36.0 | 1.053 |
| 9 | −231.561 | 1.86 | 1.73234 | 54.4 | 1.001 |
| 10 | −30.684 | 3.06 | — | — | — |
| 11 | −48.002 | 2.63 | 1.74795 | 44.5 | 1.030 |
| 12 | −18.658 | — | — | — | — |

* indicates the diffraction surface.

Diffraction surface data:

the coefficient of the optical path difference function $\psi(h)$ at the seventh surface is $P_2=-0.444$ The power $\Phi_1$ of the diffraction lens in the second embodiment is given by $\Phi_1 = -2 \times (-0.444) \times 0.00054607 = 0.00048491/$mm. Therefore, the focal length $f_D$, which is obtained by $1/\Phi_1$, is 2062 mm.

EXAMPLE 3

FIG. 9 shows a lens arrangement of the third embodiment of an achromatic lens system according to the present invention. The basic structure is substantially the same as that of the first embodiment. Unlike the first and second embodiments, the diaphragm S is located in front of the diffraction lens 12. In this example, the diaphragm S is located at a predetermined distance from the object-side surface (the diffracting surface 12*a*) of the diffracting lens 12. FIGS. 10 and 11 show aberration diagrams. Numerical data of the third embodiment is shown in Table 3 below. FIG. 12 shows an axial chromatic aberration of the front lens group and the rear lens group when no diffraction lens is provided.

TABLE 3

$F_{NO} = 1:4.5$
$f = 55.6$
$M = -0.189$
$W = 17.9°$

| Surface No. | R | D | $N_e$ | $\nu_e$ | $\theta_{ge}$ |
|---|---|---|---|---|---|
| 1 | 34.013 | 4.50 | 1.81077 | 40.7 | 1.035 |
| 2 | 74.714 | 4.00 | — | — | — |
| 3 | 17.910 | 4.50 | 1.69974 | 56.2 | 0.998 |
| 4 | 32.846 | 2.00 | 1.67158 | 32.8 | 1.060 |
| 5 | 10.997 | 8.00 | — | — | — |
| Diaphragm | ∞ | 1.24 | — | — | — |
| 6 * | ∞ | 1.00 | 1.49379 | — | — |
| 7 | ∞ | 9.00 | — | — | — |
| 8 | −15.749 | 1.00 | 1.72311 | 29.3 | 1.072 |
| 9 | −47.135 | 4.04 | 1.71677 | 42.9 | 1.036 |
| 10 | −16.346 | 0.10 | — | — | — |
| 11 | −258.843 | 3.01 | 1.73234 | 54.4 | 1.001 |
| 12 | −37.612 | — | — | — | — |

* indicates the diffraction surface.

Diffraction surface data:

the coefficient of the optical path difference function $\psi(h)$ at the sixth surface is $P_2=-0.590$ The power $\Phi_1$ of the diffraction lens in the third embodiment is given by $\Phi_1 = -2 \times (-0.590) \times 0.00054607 = 0.00064436/$mm. Therefore, the focal length $f_D$, which is obtained by $1/\Phi_1$, is 1552 mm.

EXAMPLE 4

Figure 13:
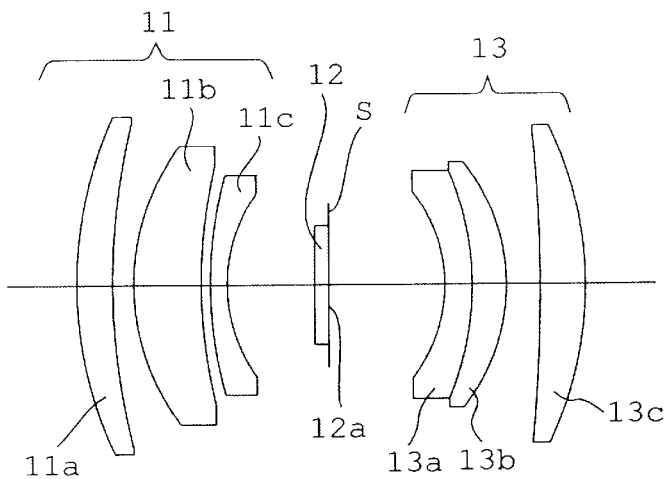
FIG. 13 is a schematic view of a lens arrangement of an achromatic lens system according to a fourth embodiment of the present invention.
Figures 14A, 14B, 14C, 14D:
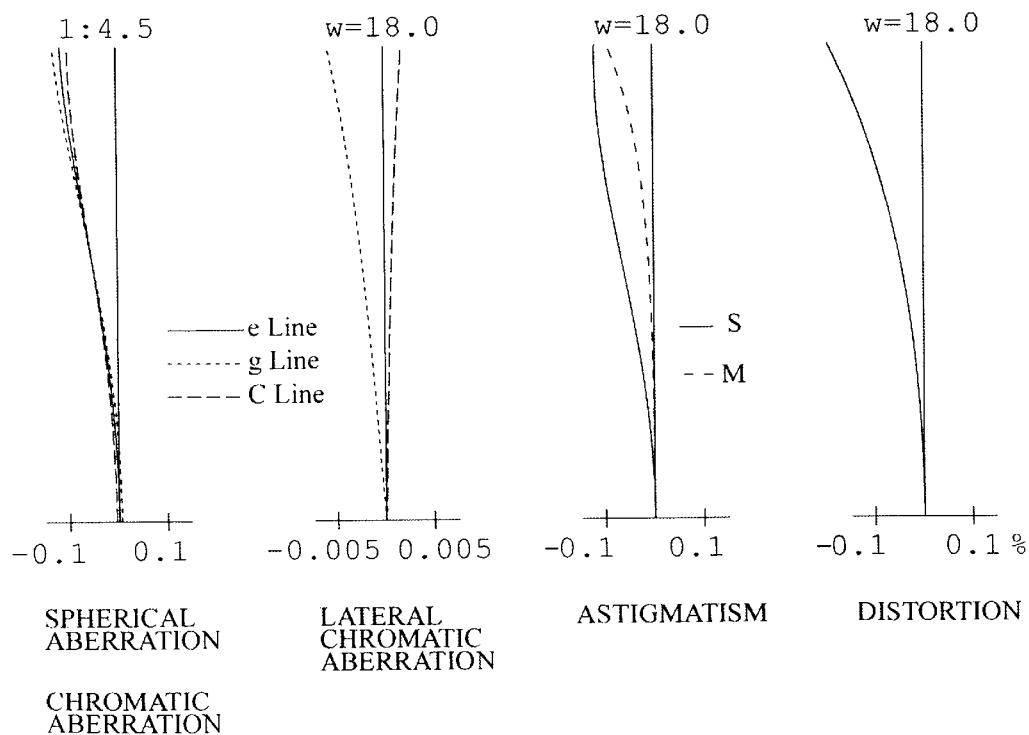
FIGS. 14A–14D show aberration diagrams of an achromatic lens system shown in FIG. 13.

FIG. 13 shows a lens arrangement of the fourth embodiment of an achromatic lens system according to the present invention. The basic structure is substantially the same as that of the first embodiment. On the other hand, in the fourth embodiment, the positive lens element 11*b* and the negative lens element 11*c* of the front lens group 11 are not cemented to each other. FIGS. 14 and 15 show aberration diagrams thereof. Numerical data of the fourth embodiment is shown in Table 4 below. FIG. 16 shows an axial chromatic aberration of the front lens group and the rear lens group when no diffraction lens is provided.

TABLE 4

$F_{NO} = 1:4.5$
$f = 54.8$
$M = -0.189$
$W = 18.0°$

| Surface No. | R | D | $N_e$ | $\nu_e$ | $\theta_{ge}$ |
|---|---|---|---|---|---|
| 1 | 30.428 | 2.56 | 1.83945 | 42.5 | 1.028 |
| 2 | 50.886 | 1.50 | — | — | — |
| 3 | 17.496 | 4.89 | 1.69974 | 56.2 | 0.998 |
| 4 | 38.549 | 0.65 | — | — | — |
| 5 | 30.600 | 1.22 | 1.67158 | 32.8 | 1.060 |
| 6 | 11.954 | 6.29 | — | — | — |
| 7 | ∞ | 1.00 | 1.49379 | — | — |
| 8 * | ∞ | 0.00 | — | — | — |
| Diaphragm | ∞ | 8.27 | — | — | — |
| 9 | −11.665 | 1.94 | 1.72311 | 29.3 | 1.072 |

TABLE 4-continued

| 10 | -22.420 | 2.43 | 1.71677 | 42.9 | 1.036 |
| 11 | -15.066 | 2.40 | — | — | — |
| 12 | -123.207 | 3.21 | 1.73234 | 54.4 | 1.001 |
| 13 | -28.113 | — | — | — | — |

* indicates the diffraction surface.

Diffraction surface data:

the coefficient of the optical path difference function ψ(h) at the eighth surface is $P_2=-0.602$.

The power $\Phi_1$ of the diffraction lens in the fourth embodiment is given by $\Phi_1=-2\times(-0.602)\times0.00054607=0.00065747$/mm. Therefore, the focal length fD, which is obtained by $1/\Phi_1$, is 1521 mm.

EXAMPLE 5

Figure 17:
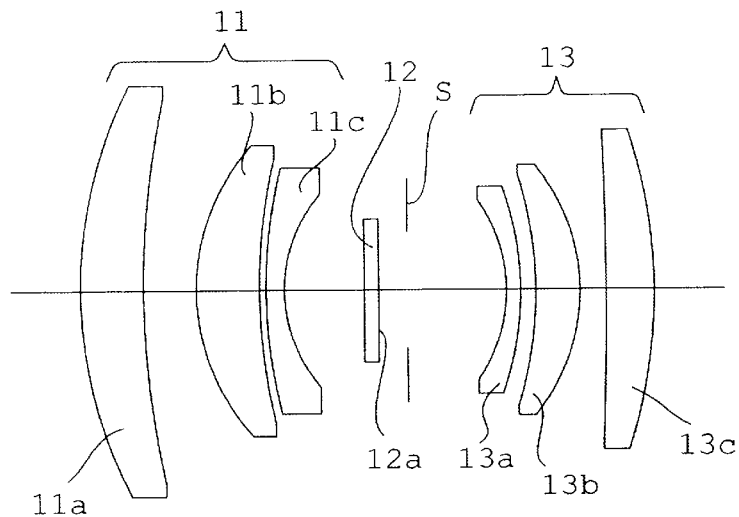
FIG. 17 is a schematic view of a lens arrangement of an achromatic lens system according to a fifth embodiment of the present invention.
Figure 18A:
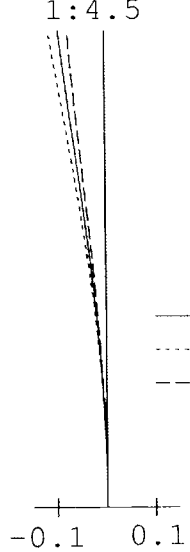
FIGS. 18A–18D show aberration diagrams of an achromatic lens system shown in FIG. 17.
Figure 18B:
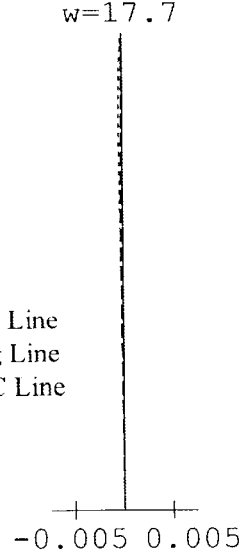
Figure 18C:
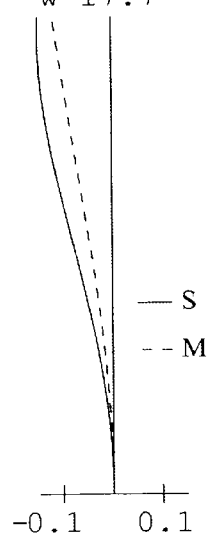
Figure 18D:
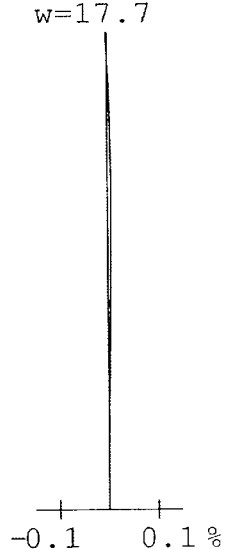

FIG. 17 shows a lens arrangement of the fifth embodiment of an achromatic lens system according to the present invention. The basic structure is substantially the same as that of the first embodiment. On the other hand, in the fifth embodiment, the positive lens element 11b and the negative lens element 11c of the front lens group 11 are not cemented to each other, or the negative first lens element 13a and the positive second lens element 13b of the rear lens group 13 are not cemented. FIGS. 18 and 19 show aberration diagrams thereof. Numerical data of the fifth embodiment is shown in Table 5 below. FIG. 20 shows an axial chromatic aberration of the front lens group and the rear lens group when no diffraction lens is provided.

TABLE 5

$F_{NO}$ = 1:4.5
f = 54.8
M = -0.189
W = 17.7°

| Surface No. | R | D | $N_e$ | $\nu_e$ | $\theta_{ge}$ |
|---|---|---|---|---|---|
| 1 | 33.339 | 4.50 | 1.81077 | 40.7 | 1.035 |
| 2 | 66.781 | 3.75 | — | — | — |
| 3 | 16.249 | 4.50 | 1.69974 | 56.2 | 0.998 |
| 4 | 42.532 | 0.48 | — | — | — |
| 5 | 37.665 | 1.31 | 1.67158 | 32.8 | 1.060 |
| 6 | 11.084 | 5.66 | — | — | — |
| 7 | -572.368 | 1.00 | 1.49379 | — | — |
| 8 * | ∞ | 1.80 | — | — | — |
| Diaphragm | ∞ | 7.26 | — | — | — |
| 9 | -11.696 | 1.00 | 1.72311 | 29.3 | 1.072 |
| 10 | -23.117 | 1.06 | — | — | — |
| 11 | -29.681 | 3.14 | 1.71677 | 42.9 | 1.036 |
| 12 | -14.862 | 1.82 | — | — | — |
| 13 | -291.869 | 3.39 | 1.73234 | 54.4 | 1.001 |
| 14 | -38.846 | — | — | — | — |

* indicates the diffraction surface.

Diffraction surface data:

The coefficient of the optical path difference function ψ(h) at the eighth surface is $P_2=-0.616$.

The power $\Phi_1$ of the diffraction lens in the fifth embodiment is obtained by $\Phi_1=-2\times(-0.616)\times0.00054607=0.00067100$/mm. Therefore, the focal length $f_D$, which is obtained by $1/\Phi_1$, is 1490 mm.

EXAMPLE 6

Figure 21:
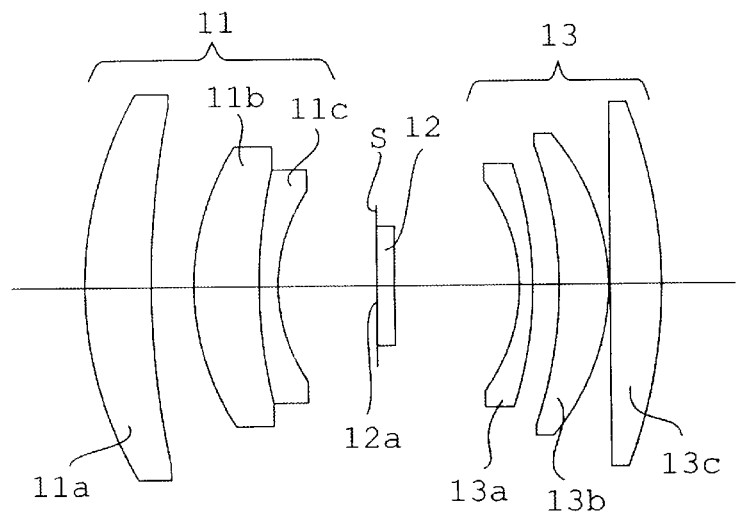
FIG. 21 is a schematic view of a lens arrangement of an achromatic lens system according to a sixth embodiment of the present invention.
Figure 22A:
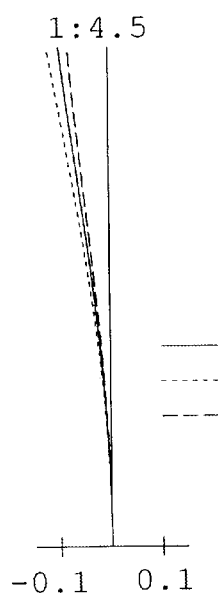
FIGS. 22A–22D show aberration diagrams of an achromatic lens system shown in FIG. 21.
Figure 22B:
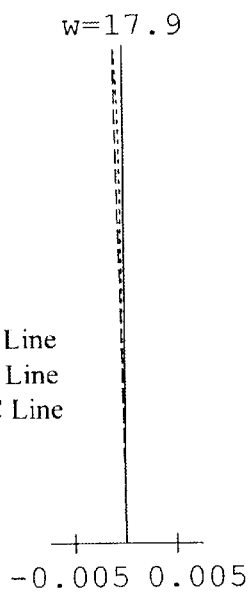
Figure 22C:
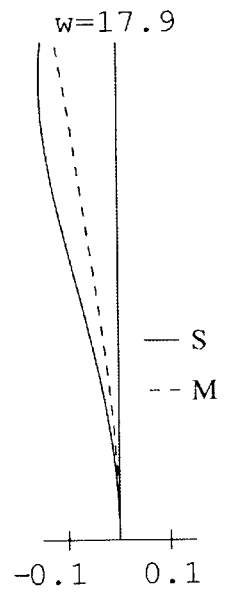
Figure 22D:
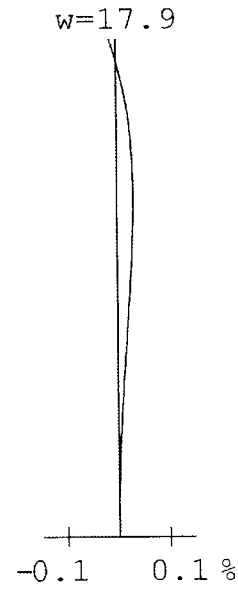
Figure 27A:
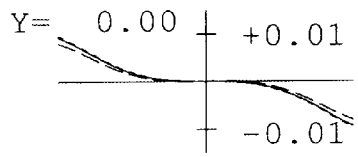
FIGS. 27A–27D show aberration diagrams of an achromatic lens system shown in FIG. 25.
Figure 27B:
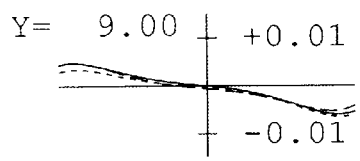
Figure 27C:
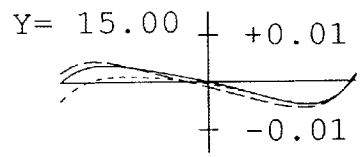
Figure 27D:
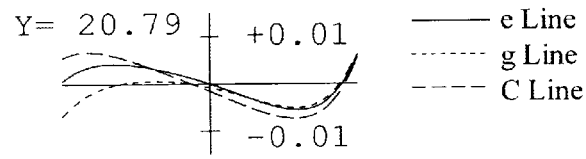

FIG. 21 shows a lens arrangement of the sixth embodiment of an achromatic lens system according to the present invention. The basic structure is substantially the same as that of the first embodiment. On the other hand, in the sixth embodiment, the negative first lens element 13a and the positive second lens element 13b of the rear lens group 13 are not cemented to each other. The diaphragm S is located on the object side of the diffraction lens. The diaphragm S is attached to the object-side surface (the diffracting surface 12a) of the diffracting lens 12. FIGS. 22 and 23 show aberration diagrams thereof. Numerical data of the sixth embodiment is shown in Table 6 below. FIG. 24 shows an axial chromatic aberration of the front lens group and the rear lens group when no diffraction lens is provided.

TABLE 6

$F_{NO}$ = 1:4.5
f = 55.0
M = -0.189
W = 17.9°

| Surface No. | R | D | $N_e$ | $\nu_e$ | $\theta_{ge}$ |
|---|---|---|---|---|---|
| 1 | 27.860 | 4.50 | 1.80811 | 46.3 | 1.019 |
| 2 | 64.191 | 2.91 | — | — | — |
| 3 | 18.525 | 4.50 | 1.69974 | 56.2 | 0.998 |
| 4 | 36.457 | 1.31 | 1.67158 | 32.8 | 1.060 |
| 5 | 12.250 | 6.75 | — | — | — |
| Diaphragm | ∞ | 0.00 | — | — | — |
| 6 * | ∞ | 1.20 | 1.49379 | — | — |
| 7 | 318.023 | 8.44 | — | — | — |
| 8 | -12.875 | 0.90 | 1.72311 | 29.3 | 1.072 |
| 9 | -28.301 | 1.80 | — | — | — |
| 10 | -30.308 | 3.35 | 1.71677 | 42.9 | 1.036 |
| 11 | -16.723 | 0.10 | — | — | — |
| 12 | ∞ | 3.51 | 1.73234 | 54.4 | 1.001 |
| 13 | -36.768 | — | — | — | — |

* indicates the diffraction surface.

Diffraction surface data:

the coefficient of the optical path difference function ψ(h) at the sixth surface is $P_2=-0.636$.

The power $\Phi_1$ of the diffraction lens in the Embodiment 6 is given by $\Phi_1=-2\times(-0.636)\times0.00054607=0.00069460$/mm. Therefore, the focal length $f_D$, which is obtained by $1/\Phi_1$, is 1440 mm.

EXAMPLE 7

Figure 28:
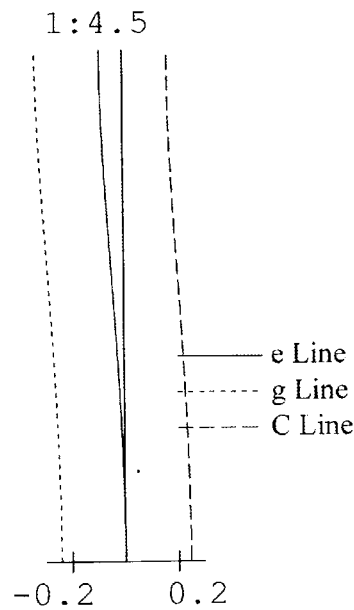
FIG. 28 shows axial chromatic aberration diagrams of a front lens group and a rear lens group in an achromatic lens system shown in FIG. 25, in which no diffraction lens is used.

FIG. 25 shows a lens arrangement of the seventh embodiment of an achromatic lens system according to the present invention. The basic structure is substantially the same as that of the first embodiment. On the other hand, in the seventh embodiment, the diaphragm S is provided on the object side of the diffraction lens 12. FIGS. 26 and 27 show aberration diagrams thereof. Numerical data of the seventh embodiment is shown in Table 7 below. FIG. 28 shows an axial chromatic aberration of the front lens group and the rear lens group when no diffraction lens is provided.

TABLE 7

$F_{NO}$ = 1:4.5
f = 53.8
M = -0.189
W = 18.0°

| Surface No. | R | D | $N_e$ | $\nu_e$ | $\theta_{ge}$ |
|---|---|---|---|---|---|
| 1 | 28.750 | 4.30 | 1.70557 | 41.0 | 1.045 |
| 2 | 60.934 | 5.00 | — | — | — |
| 3 | 15.962 | 3.12 | 1.73234 | 54.4 | 1.001 |
| 4 | 56.168 | 1.00 | 1.65223 | 33.6 | 1.059 |
| 5 | 11.600 | 6.23 | — | — | — |
| Diaphragm | ∞ | 0.35 | — | — | — |
| 6 * | -23.350 | 1.01 | 1.49379 | — | — |

TABLE 7-continued

| | | | | | |
|---|---|---|---|---|---|
| 7 | −21.724 | 5.14 | — | — | — |
| 8 | −12.195 | 1.00 | 1.58482 | 40.5 | 1.042 |
| 9 | ∞ | 3.33 | 1.74679 | 49.1 | 1.013 |
| 10 | −16.307 | 4.00 | — | — | — |
| 11 | −75.993 | 5.00 | 1.74795 | 44.5 | 1.030 |
| 12 | −37.558 | — | — | — | — |

* indicates the diffraction surface.

Diffraction surface data:

the coefficient of the optical path difference function $\psi(h)$ at the sixth surface is $P_2 = -0.509$.

The power $\Phi_1$ of the diffraction lens in the Embodiment 7 is given by $\Phi_1 = -2 \times (-0.509) \times 0.00054607 = 0.00055590/$mm. Therefore, the focal length $f_D$, which is obtained by $1/\Phi_1$, is 1799 mm.

EXAMPLE 8

FIG. 29 shows a lens arrangement of the eighth embodiment of an achromatic lens system according to the present invention. The basic structure is substantially the same as that of the first embodiment. FIGS. 30 and 31 show aberration diagrams thereof. Numerical data of the eighth embodiment is shown in Table 8 below. FIG. 32 shows an axial chromatic aberration of the front lens group and the rear lens group when no diffraction lens is provided.

TABLE 8

$F_{NO} = 1:4.5$
$f = 53.7$
$M = -0.189$
$W = 18.0°$

| Surface No. | R | D | $N_e$ | $\nu_e$ | $\theta_{ge}$ |
|---|---|---|---|---|---|
| 1 | 28.855 | 3.08 | 1.70557 | 41.0 | 1.045 |
| 2 | 60.803 | 4.40 | — | — | — |
| 3 | 15.461 | 3.63 | 1.73234 | 54.4 | 1.001 |
| 4 | 52.490 | 1.00 | 1.65223 | 33.6 | 1.059 |
| 5 | 11.471 | 5.65 | — | — | — |
| 6 | ∞ | 1.00 | 1.49379 | — | — |
| 7 * | ∞ | 0.00 | — | — | — |
| Diaphragm | ∞ | 7.81 | — | — | — |
| 8 | −13.233 | 1.00 | 1.62409 | 36.0 | 1.053 |
| 9 | ∞ | 3.85 | 1.74795 | 44.5 | 1.030 |
| 10 | −18.348 | 0.63 | — | — | — |
| 11 | −99.944 | 5.00 | 1.74795 | 44.5 | 1.030 |
| 12 | −35.038 | — | — | — | — |

* indicates the diffraction surface.

Diffraction surface data:

the coefficient of the optical path difference function $\psi(h)$ at the seventh surface is $P_2 = -0.537$.

The power $\Phi_1$ of the diffraction lens in the Embodiment 8 is given by $\Phi_1 = -2 \times (-0.537) \times 0.00054607 = 0.00058650/$mm. Therefore, the focal length $f_D$, which is obtained by $1/\Phi_1$, is 1705 mm.

EXAMPLE 9

FIG. 33 shows a lens arrangement of the ninth embodiment of an achromatic lens system according to the present invention, of which the basic structure is substantially the same as that of the first embodiment. On the other hand, in the ninth embodiment, the diaphragm S is attached to the object-side surface(the diffracting surface 12a) of the diffraction lens 12. FIGS. 34 and 35 show aberration diagrams thereof. Numerical data of the ninth embodiment is shown in Table 9 below. FIG. 36 shows an axial chromatic aberration of the front lens group and the rear lens group when no diffraction lens is provided.

TABLE 9

$F_{NO} = 1:4.5$
$f = 54.1$
$M = -0.189$
$W = 18.2°$

| Surface No. | R | D | $N_e$ | $\nu_e$ | $\theta_{ge}$ |
|---|---|---|---|---|---|
| 1 | 28.026 | 3.15 | 1.83932 | 36.9 | 1.045 |
| 2 | 56.007 | 2.66 | — | — | — |
| 3 | 19.094 | 4.18 | 1.72341 | 50.0 | 1.014 |
| 4 | ∞ | 1.00 | 1.65223 | 33.6 | 1.059 |
| 5 | 12.347 | 7.30 | — | — | — |
| Diaphragm | ∞ | 0.00 | — | — | — |
| 6 * | −363.052 | 1.00 | 1.49379 | — | — |
| 7 | ∞ | 6.29 | — | — | — |
| 8 | −11.531 | 1.04 | 1.62409 | 36.0 | 1.053 |
| 9 | −25.169 | 3.01 | 1.74435 | 44.5 | 1.006 |
| 10 | −14.420 | 4.64 | — | — | — |
| 11 | −300.653 | 5.00 | 1.64368 | 44.5 | 1.005 |
| 12 | −34.273 | — | — | — | — |

* indicates the diffraction surface.

Diffraction surface data:

The coefficient of the optical path difference function $\psi(h)$ at the sixth surface is $P_2 = -0.548$.

The power $\phi_1$ of the diffraction lens in the ninth embodiment is given by $\phi_1 = -2 \times (-0.548) \times 0.00054607 = 0.00058850/$mm. Therefore, the focal length fD, which is obtained by $1/\Phi_1$, is 1699 mm.

Table 10 shows numerical values of the condictions (1) and (2) for the nine embodiments mentioned above.

TABLE 10

| Embodiment | 1 | 2 | 3 | 4 |
|---|---|---|---|---|
| Condition (1) | 1.399 | 1.206 | 4.788 | 1.695 |
| Condition (2) | 0.0061 | 0.0058 | 0.0080 | 0.0089 |
| Embodiment | 5 | 6 | 7 | 8 |
| Condition (1) | 2.063 | 1.733 | 1.389 | 1.254 |
| Condition (2) | 0.0080 | 0.0088 | 0.0053 | 0.0057 |
| Embodiment | | 9 | | |
| Condition (1) | | 1.833 | | |
| Condition (2) | | 0.0063 | | |

According to the present invention, axial chromatic aberration for more than two wavelengths of light can be effectively corrected by a simple arrangement of the optical elements such as a front lens group, a diffraction lens, and a rear lens group. Moreover, an achromatic lens system of the present invention can be applied not only to a color reading lens in a facsimile machine or scanner, but also to a copying lens or photographing lens, etc.

What is claimed is:

1. An achromatic lens system comprising a front lens group, a diffraction lens and a rear lens group, in this order from the object side, wherein;

said front lens group is provided with a frontmost convex surface on the object side and a rearmost concave surface on the image side;

said rear lens group is provided with a rearmost convex surface on said image side;

said front and rear lens groups are arranged to generate under-axial chromatic aberration for blue light and generate over-axial chromatic aberration for red light, with respect to green light that is considered the reference light; and achromatic correction of light in the visible region is conducted by correcting said axial chromatic aberrations with a diffracting function of said diffraction lens.

2. The achromatic lens system according to claim 1, wherein said achromatic lens system satisfies the following conditions:

$$1.0 < f_F/f_R < 5.0 \qquad (1)$$

$$0.004 < \Phi_1/\Phi_2 < 0.011 \qquad (2)$$

wherein $f_F$ designates the focal length of the front lens group;

$f_R$ designates the focal length of the rear lens group;

$\Phi_1$ designates the diffraction power of the diffraction surface of the diffraction lens;

$\Phi_2$ designates the sum of the power of the positive lens elements of the entire lens system.

3. The achromatic lens system according to claim 1, further comprising a diaphragm between said front and rear lens groups, wherein said front lens group comprises two an positive lens elements, and a negative lens element, in this order from the object side, and said rear lens group comprises a negative lens element and two positive lens elements, in this order from the object side.

4. The achromatic lens system according to claim 3, wherein the second positive lens element of said front lens group is cemented to said negative lens element of said front lens group.

5. The achromatic lens system according to claim 4, wherein said front lens group has positive power.

6. The achromatic lens system according to claim 3, wherein said negative lens element of said rear lens group and the first positive lens element of said rear lens group are cemented to each other.

7. The achromatic lens system according to claim 6, wherein said rear lens group has positive power.

8. The achromatic lens system according to claim 1, wherein a diffraction surface of said diffracting lens is provided on the image-side surface of said diffracting lens.

9. The achromatic lens system according to claim 1, wherein a diffraction surface of said diffracting lens is provided on the object-side surface of said diffracting lens.

* * * * *